United States Patent
Oshima et al.

(10) Patent No.: US 6,620,216 B2
(45) Date of Patent: Sep. 16, 2003

(54) POLISHING COMPOSITION

(75) Inventors: Yoshiaki Oshima, Wakayama (JP); Toshiya Hagihara, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 10/218,601

(22) Filed: Aug. 15, 2002

(65) Prior Publication Data

US 2003/0110710 A1 Jun. 19, 2003

(30) Foreign Application Priority Data

Aug. 21, 2001 (JP) ........................................ 2001-250346

(51) Int. Cl.[7] .............................. C09G 1/02; C09G 1/04
(52) U.S. Cl. ............................ 51/309; 51/307; 51/308; 106/3; 438/692; 438/693; 216/89; 216/96; 216/100
(58) Field of Search .................... 51/307, 308, 309; 106/3; 438/692, 693; 216/89, 96, 106, 108, 100; 252/79.1, 79.2, 79.4

(56) References Cited

U.S. PATENT DOCUMENTS

| | | | |
|---|---|---|---|
| 6,068,787 A | * 5/2000 | Grumbine et al. | 216/88 |
| 6,123,603 A | 9/2000 | Tada et al. | |
| 6,149,696 A | 11/2000 | Jia | |
| 6,309,434 B1 | * 10/2001 | Ohashi | 106/3 |
| 6,316,366 B1 | * 11/2001 | Kaufman et al. | 438/216 |
| 6,383,414 B1 | * 5/2002 | Pasch | 252/389.21 |
| 2001/0049913 A1 | * 12/2001 | Miyata | 51/308 |

FOREIGN PATENT DOCUMENTS

| | | |
|---|---|---|
| JP | 9-204657 A | 8/1997 |
| JP | 9-208934 A | 8/1997 |
| JP | 10-226784 A2 | 8/1998 |
| JP | 11-167715 A2 | 6/1999 |
| JP | 11-246849 A2 | 9/1999 |
| WO | 98/13536 A1 | 4/1998 |

* cited by examiner

*Primary Examiner*—Michael Marcheschi
(74) *Attorney, Agent, or Firm*—Birch, Stewart, Kolasch & Birch, LLP

(57) ABSTRACT

A polishing composition comprising an abrasive having an average primary particle size of 200 nm or less, an oxidizing agent, an acid having a pK1 of 2 or less and/or a salt thereof, and water, wherein the acid value (Y) of the polishing composition is 20 mg KOH/g or less and 0.2 mg KOH/g or more; a process for reducing fine scratches of a substrate, comprising polishing a substrate to be polished with the above-mentioned polishing composition; and a method for manufacturing a substrate, comprising polishing a substrate to be polished with the above-mentioned polishing composition. The polishing composition can be suitably used for final polishing memory hard disk substrates and polishing semiconductor elements.

9 Claims, No Drawings

POLISHING COMPOSITION

BACKGROUND OF THE INVENTION

1. Field of the Invention

The present invention relates to a polishing composition, a process for reducing fine scratches of a substrate with the polishing composition, and a method for manufacturing a substrate with the polishing composition. The polishing composition can be suitably used for final polishing memory hard disk substrates and polishing semiconductor elements.

2. Discussion of the Related Art

Recent memory hard disk drives have been demanded to have high areal density and small size. In order to increase the areal density, it has been strongly urged to lower flying height of a magnetic head and to reduce the unit area of recording. Along with this trend, the surface quality required after polishing has become severely assessed every year even in a method for manufacturing a magnetic disk substrate. In order to meet the requirement of the low flying height of the head, the disk surface is required to have reduced surface roughness, micro-waviness, roll-off, and projections. In order to meet the requirement of the reduction of the unit area of recording, sizes and depth of permitted scratches and pits have become increasingly small.

Also, in the field of semiconductors, the trends of producing thinner wiring have been progressed along with the trends of highly integrated circuits and higher speed at the operating frequencies. Even in the method for manufacturing a semiconductor device, since the focal depth becomes shallow with the trend of thinning the wiring during the exposure of a photoresist, further smoothening of a pattern-forming surface has been desired.

In order to meet such requirements, there have been proposed polishing compositions with improved surface smoothness such as surface roughness Ra and Rmax, scratches, pits and projections (Japanese Patent Laid-Open Nos. Hei 9-204657, Hei 11-167715 and Hei 11-246849). However, as a consequence of improved surface smoothness, there have been newly found fine scratches having depth of 0.1 nm or more and less than 5 nm, a width of 10 $\mu$m or more and less than 50 $\mu$m, and a length of 10 $\mu$m or more and less than 1 mm have been found. Therefore, the reduction of the generation of such fine scratches is a problem to be solved. In addition, there has been conventionally known to further add a polishing step using a colloidal silica in order to reduce scratches. However, when this polishing step is carried out, there are some defects such that the number of steps is increased, so that the polishing rate is delayed and that the productivity is lowered.

An object of the present invention is to provide a polishing composition for final polishing memory hard disk substrates and polishing semiconductor elements, which can make the surface roughness of the object to be polished after polishing small and remarkably reduce surface defects such as projections and polishing damages, especially reducing fine scratches having depth of 0.1 nm or more and less than 5 nm, a width of 10 $\mu$m or more and less than 50 $\mu$m, and a length of 10 $\mu$m or more and less than 1 mm, and can accomplish economic polishing, a process for reducing fine scratches of a substrate with the polishing composition, and a method for manufacturing a substrate with the polishing composition.

SUMMARY OF THE INVENTION

According to the present invention, there are provided:

(1) a polishing composition comprising an abrasive having an average primary particle size of 200 nm or less, an oxidizing agent, an acid having a pK1 of 2 or less and/or a salt thereof, and water, wherein the acid value (Y) of the polishing composition is 20 mg KOH/g or less and 0.2 mg KOH/g or more;

(2) a process for reducing fine scratches of a substrate, comprising polishing a substrate to be polished with the polishing composition of item (1) above; and (3) a method for manufacturing a substrate, comprising polishing a substrate to be polished with the polishing composition of item (1) above.

DETAILED DESCRIPTION OF THE INVENTION

As mentioned above, the polishing composition of the present invention comprises an abrasive having an average primary particle size of 200 nm or less, an oxidizing agent, an acid having a pK1 of 2 or less and/or a salt thereof, and water.

As the abrasive used in the present invention, any abrasives generally employed for polishing can be used. The abrasive includes, for instance, metals; carbides of metals or metalloids, nitrides of metals or metalloids, oxides of metals or metalloids, borides of metals or metalloids; diamond, and the like. The metals or metalloids include those elements belonging to the Groups 2A, 2B, 3A, 3B, 4A, 4B, 5A, 6A, 7A or 8A of the Periodic Table (long period form). Concrete examples of the abrasive include aluminum oxide, silicon carbide, diamond, magnesium oxide, zinc oxide, titanium oxide, cerium oxide, zirconium oxide, silica, and the like. It is preferable that one or more of these abrasives are used, from the viewpoint of increasing the polishing rate. Among them, aluminum oxide, silica, cerium oxide, zirconium oxide, titanium oxide, and the like are suitable for polishing semiconductor wafers and semiconductor elements and substrates for precision parts such as substrates for magnetic recording media. As to the aluminum oxide, those having various crystal forms such as $\alpha$, $\theta$ and $\gamma$ have been known, which can be appropriately selected and used depending upon the applications. Moreover, the silica, especially colloidal silica is suitable for an application of final polishing of a magnetic disk substrate having high recording density and an application of polishing a semiconductor device substrate, which require a higher level of smoothness.

The abrasive has an average primary particle size of 200 nm or less, and preferably 1 nm or more, more preferably 10 nm or more, still more preferably 20 nm or more, from the viewpoint of increasing the polishing rate, and is 200 nm or less, preferably 150 nm or less, more preferably 120 nm or less, especially preferably 100 nm or less, from the viewpoints of reducing the surface roughness (Ra, Rmax) and the waviness (Wa). The abrasive has an average primary particle size of preferably from 1 to 200 nm, more preferably from 1 to 150 nm, still more preferably from 10 to 120 nm, especially preferably from 20 to 100 nm. Further, when the primary particles are aggregated to form a secondary particle, the abrasive has an average secondary particle size of preferably from 50 to 3000 nm, more preferably from 100 to 1500 nm, especially preferably from 200 to 1200 nm, from the viewpoint of similarly increasing the polishing rate and from the viewpoint of reducing the surface roughness of an object to be polished. As the average primary particle size of the abrasive, a particle size at 50% counted from a smaller size side on a number base (D50) in a cumulative particle size distribution can be determined by carrying out image analysis by observation with a scanning electron microscope (magnification: preferably from 3000 to 100000 times). Here, one primary particle size is defined as an arithmetic means of major axis length and minor axis length of the particle. In addition, the average secondary particle size can be determined as a volume-average particle size by using a laser beam diffraction method.

In addition, in the present invention, it is more preferable to use silica particles as an abrasive, from the viewpoints of reducing the surface roughness (Ra, Rmax) and the waviness (Wa), and reducing the surface defects such as scratches, thereby improving the surface quality. The silica particles include colloidal silica particles, fumed silica particles, surface-modified silica particles, and the like, among which the colloidal silica particles are preferable. Here, the colloidal silica particles can be obtained by, for instance, a process comprising generating silica particles from an aqueous silicic acid.

In the present invention, by using the polishing composition comprising silica particles having the particle size distribution shown above, there are exhibited such effects that the surface roughness of the polished substrate is made small after polishing, and that the substrate to be polished can be polished at an economical speed without generating surface defects such as projections and polishing damages.

The particle size of the silica particles in the particle size distribution mentioned above can be determined by the following method using a scanning electron microscope (hereinafter simply referred to as SEM). Specifically, a polishing composition comprising silica particles is diluted with ethanol so that the silica particle concentration is 0.5% by weight. The diluted suspension is evenly applied to a sample plate for SEM heated to about 50° C. Thereafter, excess suspension is wiped off by a filter paper, and the coat is evenly air-dried so that the suspension is not aggregated.

Pt-Pd is deposited on the air-dried silica particles. Using a field emission scanning electron microscope (FE-SEM: Model S-4000) manufactured by Hitachi LTD., of which magnification is adjusted to 3000 to 100000 times so that about 500 silica particles can be observed within the scope, two pinpoints per one sample plate are observed and a microphotograph is taken thereat. Each microphotograph taken (10.16 cm×12.7 cm) is enlarged to an A4 size (210 mm×297 mm) by a copy machine or the like, and the particle sizes of all the photographed silica particles are determined by calipers or the like and the data are summed up. The procedures are repeated for several runs, so that the number of silica particles to be determined is 2000 or more. It is more preferable that the number of determination points by SEM is increased, from the viewpoint of obtaining an accurate particle size distribution. The particle size distribution on a number base in the present invention can be obtained by summing up data for the determined particle sizes and adding its frequency (%) from a smaller particle size, with defining a particle size at 50% cumulative frequency as D50. The particle size distribution as referred to herein is obtained as the particle size distribution of the primary particle. As to the abrasive other than silica particles, in the case of a slurry form prepared by dispersing an abrasive in a solvent such as water or alcohol, the particle size distribution can be determined in the same manner as in the above-mentioned silica particles. Concrete examples of the dispersed abrasive other than silica particles include aluminum oxide, titanium oxide, zirconium oxide, zinc oxide, and the like, each of which is prepared by build-up method. On the other hand, in the case of a powdery abrasive, a sample is prepared by pasting a conductive tape on a sample stage for SEM, dispersing the abrasive powder directly on the tape, and thereafter subjecting the abrasive powder on the tape to Pt-Pd vapor deposition. Using this sample, the particle size distribution can be obtained in the same manner as in the silica particle in the subsequent steps. Concrete examples of powdery abrasive other than silica particles include silicon carbide, diamond, aluminum oxide, cerium oxide, and the like, each of which is prepared by pulverization method.

In addition, when primary particles of aluminum oxide, cerium oxide, fumed silica and the like exist in fused states, the particle size distribution can be obtained by considering the fused particles as a primary particle.

In addition, the method for adjusting the particle size distribution of the silica particles is not particularly limited. For instance, in the case where the silica particles are colloidal silica particles, the adjustment for the particle size distribution can be accomplished by a method comprising adding a new particle acting as a core in the growth method of the particle during the preparation stage, to give a final product allowed to have a particle size distribution; a method of mixing two or more types of silica particles of which particle size distributions are different from each other; and the like.

The content of the abrasive is preferably 0.5% by weight or more, more preferably 1% by weight or more, still more preferably 3% by weight or more, especially preferably 5% by weight or more, of the polishing composition, from the viewpoint of increasing the polishing rate, and the content of the abrasive is preferably 20% by weight or less, more preferably 15% by weight or less, still more preferably 13% by weight or less, especially preferably 10% by weight or less, of the polishing composition, from the viewpoint of improving the surface quality and from the viewpoint of economic advantages.

In other words, the content is preferably from 0.5 to 20% by weight, more preferably from 1 to 15% by weight, still more preferably from 3 to 13% by weight, especially preferably from 5 to 10% by weight.

The oxidizing agent used in the present invention includes, peroxides, permanganic acid or salts thereof, chromic acid or salts thereof, nitric acid or salts thereof, peroxo acid or salts thereof, oxyacid or salts thereof, metal salts, sulfuric acid, and the like. In the present invention, there is an advantage of the use of the above oxidizing agent in that the polishing rate can be increased.

The above-mentioned peroxide includes hydrogen peroxide, sodium peroxide, barium peroxide, and the like; the permanganic acid or salts thereof include potassium permanganate, and the like; the chromic acid or salts thereof include metal salts of chromic acid, metal salts of dichromic acid, and the like; the nitric acid or salts thereof include nitric acid, iron (III) nitrate, ammonium nitrate, and the like; the peroxo acid or salts thereof include peroxodisulfuric acid, ammonium peroxodisulfate, metal salts of peroxodisulfuric acid, peroxophosphoric acid, peroxosulfuric acid, sodium peroxoborate, performic acid, peracetic acid, perbenzoic acid, perphthalic acid, and the like; oxyacid or salts thereof include hypochlorous acid, hypobromous acid, hypoiodous acid, chioric acid, bromic acid, iodic acid, sodium hypochlorate, calcium hypochiorate, and the like; metal salts include iron (III) chloride, iron (III) sulfate, iron (III) citrate, ammonium iron (III) sulfate, and the like. The preferred oxidizing agent is hydrogen peroxide, iron (III)

nitrate, peracetic acid, ammonium peroxodisulfate, iron (III) sulfate, ammonium iron (III) sulfate and the like. Especially, hydrogen peroxide is preferable, from the viewpoints of being widely used and inexpensive without depositing metal ions to the surface of the substrate. These oxidizing agents can be used alone or in admixture of two or more kinds. Among these oxidizing agent, nitric acid or salts thereof can be also used as an acid having pK1 of 2 or less or salts thereof described below.

The content of the oxidizing agent is preferably 0.002% by weight or more, more preferably 0.005% by weight or more, still more preferably 0.007% by weight or more, especially preferably 0.01% by weight or more, of the polishing composition, from the viewpoint of increasing the polishing rate. Also, the content is preferably 20% by weight or less, more preferably 15% by weight or less, still more preferably 10% by weight or less, especially preferably 5% by weight or less, of the polishing composition, from the viewpoints of reducing the surface roughness and the waviness, and reducing the surface defects such as pits and scratches, thereby improving the surface quality, and from the viewpoint of economic advantages. The content is preferably from 0.002 to 20% by weight, more preferably from 0.005 to 15% by weight, still more preferably from 0.007 to 10% by weight, especially preferably from 0.01 to 5% by weight, of the polishing composition.

As the acid and/or salts thereof used in the present invention, those compounds of which acidic form has pK1 of 2 or less are preferable. The compounds of which acidic form has pK1 of 1.5 or less, more preferably 1 or less, most preferably those having such strong acidity which cannot be expressed by pK1 are desirable, from the viewpoint of reducing fine scratches. Examples thereof include an inorganic acid, such as nitric acid, sulfuric acid, sulfurous acid, persulfuric acid, hydrochloric acid, perchloric acid, phosphoric acid, phosphonic acid, phosphinic acid, pyrophosphoric acid, tripolyphosphoric acid, or amide sulfuric acid, and a salt thereof; organic phosphonic acid, such as 2-aminoethylphosphonic acid, 1-hydroxyethylidene-1,1-diphosphonic acid, aminotri(methylenephosphonic acid), ethylenediaminetetra(methylenephosphonic acid), diethylenetriaminepenta(methylenephosphonic acid), ethane-1,1-diphosphonic acid, ethane-1,1,2-triphosphonic acid, ethane-1-hydroxy-1,1-diphosphonic acid, ethane-1-hydroxy-1,1,2-triphosphonic acid, ethane-1,2-dicarboxy-1,2-diphosphonic acid, methanehydroxyphosphonic acid, 2-phosphonobutane-1,2-dicarboxylic acid, 1-phosphonobutane-2,3,4-tricarboxylic acid, or α-methylphosphonosuccinic acid, and a salt thereof; an aminocarboxylic acid, such as glutamic acid, picolinic acid, or aspartic acid, and a salt thereof; a carboxylic acid, such as oxalic acid, nitroacetic acid, maleic acid, or oxaloacetic acid, and a salt thereof; and the like. Among them, the inorganic acids, the organic phosphonic acids, and salts thereof are preferable, from the viewpoint of reducing the fine scratches. Among the inorganic acid and a salt thereof, nitric acid, sulfuric acid, hydrochloric acid, perchloric acid and salts thereof are more preferable. Among the organic phosphonic acid and a salt thereof, 1-hydroxyethylidene-1,1-diphosphonic acid, aminotri(methylenephosphonic acid), ethylenediaminetetra(methylenephosphonic acid), diethylenetriaminepenta(methylenephosphonic acid), and salts thereof are more preferable. These acids and salts can be used alone or in admixture of two or more kinds. Here, pK1 is defined as follows: A logarithmic value of an inverse of an acid dissociation constant (at 25° C.) of an organic compound or an inorganic compound is usually expressed as pKa, and a logarithmic value of an inverse of a first acid dissociation constant is defined as pK1. pK1 of each compound is listed in, for instance, in *Kagaku Binran* (*Kiso-hen*) II, Fourth Revision, pp. 316–325 (Edit. by Nippon Kagakukai), and the like. In the present invention, it is especially preferable to use those acids having pK1 of 2 or less and/or a salt thereof, from the viewpoint of satisfying both reduction of fine scratches and increase in the polishing rate.

The salts of these acids are not particularly limited. Concrete examples thereof include salts with a metal, ammonium, an alkylammonium, an organic amine or the like. Concrete examples of the metals include those metals belonging to the Groups 1A, 1B, 2A, 2B, 3A, 3B, 4A, 6A, 7A or 8 of the Periodic Table (long period form). Among them, the salt with the metal belonging to Group 1A or with ammonium is preferable, from the viewpoint of reducing the fine scratches.

The content of the acid having pK1 of 2 or less and a salt thereof is preferably from 0.0001 to 5% by weight, more preferably from 0.0003 to 3% by weight, still more preferably from 0.001 to 2% by weight, especially preferably from 0.0025 to 1% by weight, of the polishing composition, from the viewpoint of exhibiting sufficient polishing rate and from the viewpoint of improving the surface quality.

Water in the polishing composition of the present invention is used as a medium. From the viewpoint of efficiently polishing the object to be polished, the water content is preferably 55% by weight or more, more preferably 67% by weight or more, still more preferably 75% by weight or more, especially preferably 84% by weight or more, of the polishing composition, and the water content is preferably 99.4979% by weight or less, more preferably 98.9947% by weight or less, still more preferably 96.992% by weight or less, especially preferably 94.9875% by weight or less, of the polishing composition. The water content is preferably from 55 to 99.4979% by weight, more preferably from 67 to 98.9947% by weight, still more preferably from 75 to 96.992% by weight, especially preferably from 84 to 94.9875% by weight.

The concentration of each component of the above-mentioned polishing composition may be any of the concentration during the preparation of the composition and the concentration upon use. In many cases, the polishing composition is usually prepared as a concentrate, which is diluted upon use.

In addition, there can be added other component to the polishing composition of the present invention as occasion demands. The other component includes thickeners, dispersing agents, anticorrosive agents, basic substances, surfactants, and the like.

The polishing composition of the present invention can be prepared by mixing an abrasive having an average primary particle size of 200 nm or less, an oxidizing agent, an acid having a pK1 of 2 or less and/or a salt thereof, and water, and other components as occasion demands by a known method.

The polishing composition of the present invention has an acid value (Y) of 20 mg KOH/g or less and 0.2 mg KOH/g or more. Especially when an organic phosphonic acid is contained in the polishing composition as the acid having a pK1 of 2 or less, the acid value (Y) is preferably 15 mg KOH/g or less, more preferably 10 mg KOH/g or less, especially preferably 7 mg KOH/g or less, most preferably 3 mg KOH/g or less, from the viewpoint of reducing fine scratches. When an inorganic acid is contained in the polishing composition as the acid having a pK1 of 2 or less, the acid value (Y) is preferably 5 mg KOH/g or less, more preferably 3 mg KOH/g or less, especially preferably 1.8 mg KOH/g or less, most preferably 1.5 mg KOH/g or less, from the viewpoint of reducing fine scratches.

In addition, the acid value (Y) is preferably 0.2 mg KOH/g or more, more preferably 0.25 mg KOH/g or more, still more preferably 0.3 mg KOH/g or more, still more preferably 0.35 mg KOH/g or more, still more preferably 0.4 mg KOH/g or more, still more preferably 0.45 mg KOH/g or more, still more preferably 0.5 mg KOH/g or more, especially preferably 0.75 mg KOH/g or more, most preferably 1.0 mg KOH/g or more, from the viewpoint of increasing the polishing rate.

The acid value (Y) is determined by a method in accordance with JIS K 1557, in which the acid value is obtained as an amount of potassium hydroxide (mg) which is required for neutralizing 1 g of the polishing composition.

In addition, it is preferable that the acid value (Y) of the polishing composition of the present invention satisfies the formula (1):

$$Y(\text{mg KOH/g}) \leq 5.7 \times 10^{-17} \times X(/\text{g}) + 19.45 \quad (1)$$

wherein X is a concentration of the abrasive in the polishing composition on a number base,
from the viewpoint of reducing fine scratches.

As mentioned above, the term "fine scratches" refers to surface defects which have not been remarked until recently, and the mechanism of the generation of such fine scratches has not been elucidated at all. Therefore, as a result of intensive studies on the mechanism, surprisingly the present inventors have newly found that the generation of the fine scratches is dependent on the balance between a degree of corrosivity of the polishing composition and a degree of direct contact of a polishing pad with an object to be polished during polishing. Concretely, the present inventors have found that the fine scratches can be significantly reduced by using the polishing composition satisfying the relationship of the above-mentioned formula (1) in which the degree of corrosivity of the polishing composition is shown by the acid value, and the degree of direct contact of the polishing pad with the object to be polished is shown by the concentration of the abrasive on number base.

In the present invention, when the acid value (Y) of the polishing composition and the concentration of the abrasive on number base satisfies the relationship of the formula (1), there can be maintained a good balance between a mechanical factor (direct contact of the pad with the object to be polished) and a chemical factor (corrosivity) for the object to be polished, so that there is exhibited an effect that the fine scratches are significantly reduced. Here, the formula (1) shows the relationship between the concentration (X) of the abrasive on number base, which is the mechanical factor, and the acid value (Y), which is the chemical factor. Therefore, since the acid value (Y) is equal to or less than the value derived from a linear function of the concentration of the abrasive on the right hand side of the formula, once the conditions for the direct contact of the pad with the object to be polished in the specified concentration (X) of the abrasive on number base are fixed, the upper limit of the strength of corrosivity which can remarkably reduce the fine scratches (acid value (Y)) will be fixed.

Especially when the fine scratches are more further classified into three-stages "large," "medium," and "small," in accordance with the degree of the depth of the fine scratches as described in Examples set forth below upon polishing a substrate using a polishing composition satisfying the relationship of the above-mentioned formula (1), there is exhibited an effect such that the three kinds of fine scratches on the substrate can be reduced to an extent that the fine scratches would not cause any problems for practical use.

The concentration (/g) of the abrasive on number base, X, in the polishing composition is obtained by the following equation (2):

$$X = \frac{(\text{Weight Percent of Abrasive})/100}{(\text{True Specific Gravity of Abrasive (g/cm}^3)) \times 4\pi/3 \times (\text{Average Particle Size of Primary Particles (cm)}/2)^3} \quad (2)$$

As to the true specific gravity of the abrasive, in the case of a silica, there can be used, for instance, a literature value of 2.2 g/cm³ for the amorphous silica in accordance of "The Chemistry of Silica" (ILER, Ralph K., 1979, John Wiley & Sons, Inc.). In a case where there is no literature value, the true specific gravity can be calculated from the found values for the average primary particle size and the specific surface area as determined by BET method. As the average primary particle size used herein, a particle size at 50% counted from a smaller size side on a number base (D50) in a cumulative particle size distribution can be determined by carrying out image analysis by observation with a scanning electron microscope (magnification: preferably from 3000 to 100000 times).

The method for adjusting Y, so that Y satisfies the formula (1), includes, for instance, a method for preparing a polishing composition by setting, as an upper limit of the amount of the acid, a value obtained by dividing an upper limit value of the acid value (Y) calculated from the concentration of the abrasive on number base by the previous calculation by the weight 56110 mg corresponding to 1 mol of KOH, thereby converting the units to [mol/g], and multiplying the resulting value with a factor of a molecular weight of an acid (nitric acid or the like), thereby converting the units again to the units of [% by weight]; and the like.

In addition, when the polishing composition comprises an inorganic acid and/or a salt thereof, it is preferable that Y satisfies:

$$Y(\text{mg KOH/g}) \leq 5.7 \times 10^{-17} \times X(/\text{g}) + 3.00,$$

more preferably Y satisfies:

$$Y(\text{mg KOH/g}) \leq 5.7 \times 10^{-17} \times X(/\text{g}) + 1.77,$$

especially preferably Y satisfies:

$$Y(\text{mg KOH/g}) \leq 5.7 \times 10^{-17} \times X(/\text{g}) + 1.67,$$

most preferably Y satisfies:

$$Y(\text{mg KOH/g}) \leq 5.7 \times 10^{-17} \times X(/\text{g}) + 1.47,$$

from the viewpoint of reducing fine scratches.

In addition, when the polishing composition comprises an acid other than the inorganic acid having pK1 of 2 or less and/or a salt thereof, especially an organic phosphonic acid and/or a salt thereof, it is preferable that Y satisfies:

$$Y(\text{mg KOH/g}) \leq 5.7 \times 10^{-17} \times X(/\text{g}) + 14.45,$$

more preferably Y satisfies:

$$Y(\text{mg KOH/g}) \leq 5.7 \times 10^{-17} \times X(/\text{g}) + 9.45,$$

especially preferably Y satisfies:

$$Y(\text{mg KOH/g}) \leq 5.7 \times 10^{-17} \times X(/\text{g}) + 6.45,$$

most preferably Y satisfies:

$$Y(\text{mg KOH/g}) \leq 5.7 \times 10^{-17} \times X(/\text{g}) + 2.45,$$

from the viewpoint of reducing fine scratches.

It is preferable that the pH of the polishing composition of the present invention is appropriately determined depending upon the kinds of the objects to be polished and the required properties. Although the pH of the polishing composition cannot be absolutely determined because it differs depending upon the materials of the objects to be polished, it is desirable that the pH generally in metal materials is acidic, preferably less than 7.0, more preferably 6.0 or less, still more preferably 5.0 or less, especially preferably 4.0 or less, from the viewpoint of increasing the polishing rate. In addition, the pH is preferably 1.0 or more, more preferably 1.2 or more, still more preferably 1.4 or more, especially preferably 1.6 or more, from the viewpoints of influence to a human body and corrosivity of the machine. Especially in the substrate for precision parts mainly made of a metal such as an aluminum alloy substrate manufactured by nickel-phosphorus (Ni—P) plating, it is preferable that the pH shows acidic, and that the pH is preferably 4.5 or less, more preferably 4.0 or less, still more preferably 3.5 or less, especially preferably 3.0 or less, from the viewpoint of increasing the polishing rate. Therefore, although the pH may be set in accordance with the purpose which is to be considered important, especially in the substrate for precision parts mainly made of a metal such as an aluminum alloy substrate manufactured by Ni—P plating, the pH is preferably from 1.0 to 4.5, more preferably from 1.2 to 4.0, still more preferably from 1.4 to 3.5, especially preferably from 1.6 to 3.0, from the total viewpoints mentioned above. The pH can be adjusted by properly adding an inorganic acid such as nitric acid or sulfuric acid, an organic acid such as oxalic acid, an ammonium salt, a basic substance such as an aqueous ammonia, potassium hydroxide, sodium hydroxide or an amine in a desired amount.

The process for reducing fine scratches of the present invention includes a process comprising polishing a substrate to be polished with the polishing composition of the present invention. The method for polishing a substrate to be polished comprises polishing a substrate to be polished with the polishing composition of the present invention, or with a mixture in which each component is mixed so as to give the composition of the polishing composition of the present invention, and the polishing method can be especially suitably used for the production of a substrate for precision parts. In addition, the polishing composition of the present invention can exhibit high polishing rate by remarkably reducing the generation of surface defects, especially fine scratches.

The material for the substrate to be polished by the polishing composition of the present invention includes, for instance, metals or metalloids such as silicon, aluminum, nickel, tungsten, copper, tantalum and titanium, and alloys thereof; glassy substances such as glass, glassy carbon and amorphous carbons; ceramic materials such as alumina, silicon dioxide, silicon nitride, tantalum nitride, and titanium carbide; resins such as polyimide resins; and the like. Among them, a substrate to be polished is preferably made of a metal such as aluminum, nickel, tungsten or copper, or made of an alloy containing these metals as the main components; or a substrate to be polished preferably contains these metals as in semiconductive substrates made of semiconductive elements. For instance, an aluminum alloy substrate plated with Ni—P or a glass substrate such as crystallized glass or reinforced glass is more preferable, and the aluminum alloy substrate plated with Ni—P is especially preferable.

The shape for the substrate to be polished is not particularly limited. For instance, those having shapes containing planar portions such as discs, plates, slabs and prisms, or shapes containing curved portions such as lenses can be subjects for polishing with the polishing composition of the present invention. Among them, those having the disc-shaped substrates are especially preferable in polishing.

The polishing composition of the present invention can be favorably used in polishing the substrate for precision parts. For instance, the polishing composition is suitable for polishing substrates for precision parts such as substrates for magnetic recording media such as magnetic disks, optical disks, opto-magnetic disks, and the like; photomask substrates, optical lenses, optical mirrors, optical prisms and semiconductive substrates. The polishing of the semiconductive substrates comprises the steps of polishing a silicon wafer (bare wafer), forming separation layer for an embedding element, flattening an interlayer dielectric film, forming an embedded metal line, and forming embedded capacitor, and the like. The polishing composition of the present invention is especially suitable for polishing a magnetic disk substrate. Further, the polishing composition is suitable for obtaining a magnetic disk substrate having a surface roughness (Ra) of 0.3 nm or less and a micro-waviness (Wa) of 0.3 nm or less.

In the present specification, the average deviation, of all points from a plane fit to the test part surface obtained from a roughness curve having a wave length component of 80 $\mu$m or less is expressed as Ra (JIS B0601), and the average deviation, of all points from a plane fit to the test part surface obtained from a waviness curve having a wave length component of 0.4 to 5 mm is expressed as Wa (micro-waviness). These Ra and Wa can be determined as follows:

Average Deviation, of All Points From Plane Fit to Test Part Surface: Ra

Determined under the following conditions using Talystep (TalyData 2000) manufactured by Rank Taylor-Hobson Limited.

Stylus size: 2.5 $\mu$m×2.5 $\mu$m

High-pass Filter: 80 $\mu$m

Measurement Length: 0.64 mm

Average Deviation, of All Points From Plane Fit to Micro-Waviness Data: Wa

Determined under the following conditions using New View 200 manufactured by Zygo Corp.

Object Lens: Magnification, 2.5 times

Image Zoom: Magnification, 0.5 times

Filter: Band Pass

Filter type: FFT Fixed

Filter High Wavelength: 0.4 mm

Filter Low Wavelength: 5.0 mm

Remove: Cylinder

The polishing method using the polishing composition of the present invention includes, for instance, a polishing method comprising clamping a substrate with polishing disks to which a polishing cloth made of nonwoven organic polymer fabric, is pasted; feeding a polishing composition to a polishing surface; and moving the polishing disks or the substrate, with applying a given pressure. In the above-mentioned polishing method, by using the polishing composition of the present invention, there can be exhibited such effects that the generation of fine scratches is remarkably suppressed, that the polishing rate is increased, that the generation of surface defects such as scratches and pits is suppressed, and that the surface smoothness such as surface roughness (Ra) and micro-waviness (Wa) can be improved. In other words, the above-mentioned polishing method is a process for reducing fine scratches of a substrate.

The method for manufacturing a substrate of the present invention comprises polishing a substrate to be polished with the above-mentioned polishing composition. In the method, it is preferable that the polishing step is carried out in a second step or subsequent steps among the plural polishing steps, and it is especially preferable that the polishing method is carried out in the final polishing step. For instance, the aluminum alloy substrate obtained in a single-step or two-step polishing method, which is Ni—P plated to have a surface roughness (Ra) of from 0.5 to 1.5 nm and a micro-waviness (Wa) of from 0.5 to 1 nm, is polished by the polishing step using the polishing composition of the present invention, whereby a magnetic disk substrate having a surface roughness (Ra) of 0.3 nm or less and a micro-waviness (Wa) of 0.3 nm or less, preferably a magnetic disk substrate having a surface roughness (Ra) of 0.25 nm or less and a micro-waviness (Wa) of 0.25 nm or less, can be manufactured. Especially, the polishing composition of the present invention is suitably used for the second step in the two-step polishing method during the manufacturing of the magnetic disk substrate having a surface roughness (Ra) of 0.3 nm or less and a micro-waviness (Wa) of 0.3 nm or less, preferably a magnetic disk substrate having a surface roughness (Ra) of 0.25 nm or less and a micro-waviness (Wa) of 0.25 nm or less.

The substrate thus manufactured not only has remarkably reduced fine scratches but also is excellent in the surface smoothness. As the surface smoothness, it is desired that the surface smoothness (Ra) is 0.3 nm or less, preferably 0.25 nm or less. In addition, it is desired that the micro-waviness (Wa) is 0.3 nm or less, preferably 0.25 nm or less.

As described above, by using the polishing composition of the present invention, the generation of fine scratches is remarkably reduced, and the polishing rate can be increased, and at the same time there can be efficiently manufactured a high-quality substrate having excellent surface properties such that there are little surface defects such as scratches and pits, and the surface smoothness such as surface roughness (Ra) and micro-waviness (Wa), is improved.

The polishing composition of the present invention is especially effective in the polishing method, and the polishing composition can be similarly applied to polishing steps other than the polishing method, for instance, lapping method, and the like.

EXAMPLES

Object to be Polished

Each of the resulting polishing compositions was evaluated for its polishing properties by using an Ni—P plated, aluminum alloy substrate which was previously roughly polished with a polishing liquid containing alumina abrasives so that the substrate had a surface roughness Ra of 1 nm, a thickness of 0.8 mm, and a diameter of 95 mm as a substrate to be polished.

Examples 1 to 18

As shown in Table 1, given amounts of each of the components such as a commercially available colloidal silica (A (average particle size: 50 nm), commercially available from NIPPON CHEMICAL INDUSTRIAL CO., LTD.; B (average particle size: 80 nm), commercially available from H.C. STARCK-VTECH LTD.; or C (average particle size: 20 nm), commercially available from Du Pont K.K.), 35% by weight hydrogen peroxide (commercially available from ASAHI DENKA KOGYO K.K.), 60% by weight nitric acid (commercially available from Wako Pure Chemical Industries, Ltd., pK1 being 0 or less), 98% by weight sulfuric acid, pK1 being 0 or less), and balance water, to make up a total amount of 100% by weight of a polishing composition. The order of mixing was such that hydrogen peroxide was firstly added to an aqueous solution prepared by diluting nitric acid or sulfuric acid in water, thereafter the remaining components were mixed therewith, and finally a colloidal silica slurry was quickly added to the resulting mixture, with stirring carefully attending not to cause gelation of the slurry.

Here, in the table, HEDP stands for 1-hydroxyethylidene-1,1-diphosphonic acid (commercially available from Solutia, Japan, Ltd.), and ATMP stands for aminotri (methylene phosphonic acid) (commercially available from Solutia, Japan, Ltd.).

TABLE 1

| Ex. No. | Composition of Polishing Composition (% by weight) | | | | | | | | | | Conc. of Abrasive on Number Base ($\times 10^{14}$/g) |
|---|---|---|---|---|---|---|---|---|---|---|---|
| | Colloidal Silica A | Colloidal Silica B | Colloidal Silica C | $H_2O_2$ | Nitric Acid | Sulfuric Acid | HEDP | ATMP | pH | D50 | |
| 1 | 7.0 | — | — | 1.0 | 0.05 | — | — | — | 2.5 | 50 | 4.86 |
| 2 | 7.0 | — | — | 1.0 | 0.12 | — | — | — | 2.0 | 50 | 4.86 |
| 3 | 7.0 | — | — | 1.0 | — | 0.14 | — | — | 2.0 | 50 | 4.86 |
| 4 | 7.0 | — | — | 1.0 | 0.16 | — | — | — | 1.9 | 50 | 4.86 |
| 5 | 7.0 | — | — | 1.0 | 0.20 | — | — | — | 1.8 | 50 | 4.86 |
| 6 | 7.0 | — | — | 1.0 | 0.30 | — | — | — | 1.5 | 50 | 4.86 |
| 7 | — | 8.0 | — | 1.0 | 0.05 | — | — | — | 2.4 | 80 | 1.36 |
| 8 | — | 8.0 | — | 1.0 | 0.13 | — | — | — | 2.0 | 80 | 1.36 |
| 9 | — | 8.0 | — | 1.0 | 0.20 | — | — | — | 1.8 | 80 | 1.36 |

TABLE 1-continued

| Ex. No. | Colloidal Silica A | Colloidal Silica B | Colloidal Silica C | H$_2$O$_2$ | Nitric Acid | Sulfuric Acid | HEDP | ATMP | pH | D50 | Conc. of Abrasive on Number Base ($\times 10^{14}$/g) |
|---|---|---|---|---|---|---|---|---|---|---|---|
| 10 | — | 8.0 | — | 1.0 | 0.50 | — | — | — | 1.1 | 80 | 1.36 |
| 11 | — | — | 9.0 | 0.3 | — | — | 0.42 | — | 2.2 | 20 | 97.7 |
| 12 | — | — | 9.0 | 0.3 | — | — | 1.00 | — | 1.8 | 20 | 97.7 |
| 13 | — | — | 9.0 | 0.3 | — | — | 2.00 | — | 1.5 | 20 | 97.7 |
| 14 | — | — | 9.0 | 0.3 | — | — | 3.00 | — | 1.3 | 20 | 97.7 |
| 15 | — | — | 9.0 | 1.0 | — | — | 1.00 | — | 1.8 | 20 | 97.7 |
| 16 | 7.0 | — | — | 1.0 | — | — | 1.00 | — | 1.8 | 50 | 4.86 |
| 17 | — | 8.0 | — | 1.0 | — | — | 1.00 | — | 1.8 | 80 | 1.36 |
| 18 | — | — | 9.0 | 1.0 | — | — | — | 1.00 | 2.0 | 20 | 97.7 |

Comparative Examples 1 to 7

As shown in Table 2, given amounts of a commercially available colloidal silica (A (average particle size: 50 nm), commercially available from NIPPON CHEMICAL INDUSTRIAL CO., LTD.; B (average particle size: 80 nm), commercially available from H.C. STARCK-VTECH LTD.; or C (average particle size: 20 nm), commercially available from Du Pont K.K.), 35% by weight hydrogen peroxide (commercially available from ASAHI DENKA KOGYO K.K.), 60% by weight nitric acid (commercially available from Wako Pure Chemical Industries, Ltd.), aluminum nitrate.nonahydrate (special grade, commercially available from Wako Pure Chemical Industries, Ltd.), other components, and balance water, to make up a total amount of 100% by weight of a polishing composition. The order of mixing was such that hydrogen peroxide and aluminum nitrate.nonahydrate were firstly added to an aqueous solution prepared by diluting nitric acid in water, thereafter the remaining components were mixed therewith, and finally a colloidal silica slurry was quickly added to the resulting mixture, with stirring carefully attending not to cause gelation of the slurry.

Here, in the table, ammonium peroxodisulfate and succinic acid are commercially available from Wako Pure Chemical Industries, Ltd., special grade, and aluminum nitrate stands for aluminum nitrate.nonahydrate (special grade, commercially available from Wako Pure Chemical Industries, Ltd.).

Each of the polishing compositions obtained in Examples 1 to 18 and Comparative Examples 1 to 7 was evaluated for the acid value, the concentration of abrasive on number base, the polishing rate, the fine scratches, the surface roughness, the micro-waviness, the surface defects, and the presence or absence of scratches in accordance with the following methods. The results are shown in Tables 1 to 4.

Polishing Conditions

Polishing testing machine: double-sided processing machine, Model 9B, manufactured by SPEEDFAM CO., LTD.

Polishing pad: "Belatrix N0058" (manufactured by Kanebo, LTD.).

Disc rotational speed: 35 r/min

Feeding rate for a slurry: 40 mL/min

Polishing time period: 4 minutes

Polishing load: 7.8 kPa

Number of substrates introduced: 10

Determination of Acid Value

In a 100 mL collection vial about 50 g of a polishing composition was weighed with a balance (BP221S, commercially available from Sartorius), and placed, and recorded to a fourth decimal place. Next, pH was determined with a pH meter (HM-30G, commercially available from Toa Denpa Kogyo, electrode: GST-5721C) with 3-point corrections (pH=4.01 (25° C.: phthalate pH standard solution, commercially available from Toa Denpa Kogyo), pH=6.86 (25° C.: neutral phosphate, commercially available from Toa Denpa Kogyo), pH=9.18 (25° C.: borate pH standard solution, commercially available from

TABLE 2

| Comp. Ex. No. | Colloidal Silica A | Colloidal Silica B | Colloidal Silica C | H$_2$O$_2$ | Nitric Acid | Ammonium Peroxo-disulfate | Succinic Acid | Aluminum Nitrate | HEDP | ATMP | pH | D50 | Conc. of Abrasive on Number Base ($\times 10^{14}$/g) |
|---|---|---|---|---|---|---|---|---|---|---|---|---|---|
| 1 | 7.0 | — | — | 1.0 | 0.01 | — | — | — | — | — | 6.0 | 50 | 4.86 |
| 2 | 7.0 | — | — | 1.0 | 2.5 | — | — | — | — | — | 1> | 50 | 4.86 |
| 3 | — | 8.0 | — | 1.0 | 2.5 | — | — | — | — | — | 1> | 80 | 1.36 |
| 4 | — | — | 9.0 | 0.3 | — | — | — | 0.03 | — | — | 1.9 | 20 | 97.7 |
| 5 | — | — | 9.0 | 0.3 | — | — | — | 5.00 | — | — | 1.8 | 20 | 97.7 |
| 6 | — | — | 9.0 | 3.0 | — | 4.00 | 3.00 | — | — | 0.10 | 1.7 | 20 | 97.7 |
| 7 | — | — | 9.0 | — | — | — | — | — | 5.00 | 0.10 | 1.2 | 20 | 97.7 |

KATAYAMA CHEMICAL, INC.)), with stirring with a stirrer made of Teflon. Thereto was added dropwise a 0.1 mol/L aqueous potassium hydroxide (factor 1.000, commercially available from Sigma-Aldrich, Japan) using a 10 ml titration tube, and the amount (mL) showing pH of 7.00 was determined (usually calculated by interpolation from 4 data points around pH of 7.00). The amount of potassium hydroxide required for neutralizing 1 gram of a polishing composition was calculated from the amount of the polishing composition (g) and the amount of potassium hydroxide required (mL), and this was defined as an acid value (found value) (mg KOH/g). In the tables, the acid value (calculated value) is a value obtained by substituting the concentration of the abrasive on number base as obtained below to a linear function on the right hand side of the above-mentioned formula (1).

Calculation of Concentration of Abrasive on Number Base

The concentration of the abrasive on number base was calculated by assuming that the specific gravity of the amorphous silica is 2.2 g/cm³ in the above-mentioned equation (2).

Polishing Rate

A weight difference (g) of the substrate before and after the polishing test was divided by its specific gravity (8.4 g/cm³), and the resulting quotient was further divided by the surface area (65.97 cm²) of the disk and the polishing time, thereby calculating the amount of double-sided polishing per unit time.

Fine Scratches

Entire surfaces of 10 substrates were observed with a differential interference microscopic system (industrial microscope: BX60M (commercially available from OLYMPUS OPTICAL Co., Ltd.), objective lens: UMPlan FI 5×/0.15 BD P, CCD color camera: ICD-500AC (commercially available from IKEGAMI TSUSHTINKI CO., LTD.), color monitor: UCM-1000 REV. 8 (commercially available from IKEGAMI TSUSHINKI CO., LTD.)), and the number of substrates out of 10 substrates in which fine scratches (depth: 0.1 nm or more and less than 5 nm, width: 10 μm or more and less than 50 μm, and length: 10 μm or more and less than 1 mm) were generated was counted, and classified into large/medium/small by visually examining the extent of the generation of fine scratches. The evaluation criteria for large, medium and small are as follows.

"large": depth: 1.0 nm or more and less than 5.0 nm, width: 10 μm or more and less than 50 μm, and length: 10 μm or more and less than 1 mm "medium": depth: 0.5 nm or more and less than 1.0 nm, width: 10 μm or more and less than 50 μm, and length: 10 μm or more and less than 1 mm "small": depth: 0.1 nm or more and less than 0.5 nm, width: 10 μm or more and less than 50 μm and length: 10 μm or more and less than 1 mm In the present invention, acceptable products are those in which out of 10 disks those evaluated as "large" are 0, and those evaluated as "medium" are 5 or less.

Surface Roughness (Ra, Rmax)

Both sides of the polished substrate were observed by an atomic force microscope (commercially available from Digital Instruments, "Nanoscope III, Dimension 3000") for a total of 6 points, in each side of 3 points at every 120° within the scope of 2 μm×2 μm at a scan rate of 1.0 Hz, and an average value was taken. The evaluation criteria are as follows:

Ra

○: Less than 0.35 nm
X: 0.35 nm or more

Rmax

◎: Less than 3 nm
○: 3 nm or more and less than 5 nm
Δ: 5 nm or more and less than 10 nm
X: 10 nm or more
The results are shown in Tables 3 and 4.
Here, "Ra" refers to average deviation, of all points from a plane fit to the test part surface, and "Rmax" refers to P-V value (Peak-to-Valley value).

Micro-Waviness (Wa)

The micro-waviness was determined under the conditions described above using a non-constant 3D surface profiler ("New View 200" commercially available from Zygo Corp.).

The evaluation criteria are as follows:

○: Less than 0.45 nm
X: 0.45 nm or more
The results are shown in Tables 3 and 4.

Surface Defects

Each of the substrate surface was observed with a differential interference microscope (industrial microscope: BX60M (commercially available from OLYMPUS OPTICAL Co., Ltd.), ocular lens: ×10, objective lens: ×20) at 12 locations at 30° intervals. The number of pits and projections per 12 scopes was counted.

The evaluation criteria are as follows:

○: 0 pits or projections
X: one or more pits or projections
The results are shown in Tables 3 and 4.

Scratches

Each of the surface of 10 substrates was visually observed with a high-brightness lamp (HPS-250 commercially available from Yamada Kogaku Kogyo), and the number of scratches per substrate was counted. Here, under the high-brightness lamp, the above-mentioned fine scratches could not be observed.

The evaluation criteria are as follows:

○: (scratches having a depth of 5 nm or more and a length of 1 mm or more) 5 or less scratches
X: 6 or more scratches
The results are shown in Tables 3 and 4.

TABLE 3

| Ex. No. | Acid Value (Found Value) (mg KOH/g) | Acid Value* (Calc. Value) (mg KOH/g) | Polishing Rate ($\mu$m/min.) | Fine Scratches (L/M/S)** | Surface Roughness (Ra, Rmax) | Micro-Waviness | Surface Defect | Scratches |
|---|---|---|---|---|---|---|---|---|
| 1  | 0.28  | 19.5 (1.80) | 0.05 | 0/0/0  | (○, ◎) | ○ | ○ | ○ |
| 2  | 0.60  | 19.5 (1.80) | 0.05 | 0/0/0  | (○, ◎) | ○ | ○ | ○ |
| 3  | 0.50  | 19.5 (1.80) | 0.05 | 0/0/0  | (○, ◎) | ○ | ○ | ○ |
| 4  | 1.39  | 19.5 (1.80) | 0.05 | 0/0/0  | (○, ◎) | ○ | ○ | ○ |
| 5  | 1.80  | 19.5 (1.80) | 0.05 | 0/0/1  | (○, ◎) | ○ | ○ | ○ |
| 6  | 2.58  | 19.5 (1.80) | 0.07 | 0/0/10 | (○, ◎) | ○ | ○ | ○ |
| 7  | 0.28  | 19.5 (1.78) | 0.05 | 0/0/0  | (○, ○) | ○ | ○ | ○ |
| 8  | 0.74  | 19.5 (1.78) | 0.07 | 0/0/0  | (○, ○) | ○ | ○ | ○ |
| 9  | 1.78  | 19.5 (1.78) | 0.07 | 0/0/1  | (○, ○) | ○ | ○ | ○ |
| 10 | 4.51  | 19.5 (1.78) | 0.09 | 0/3/7  | (○, ○) | ○ | ○ | ○ |
| 11 | 2.45  | 20.0        | 0.08 | 0/0/0  | (◎, ◎) | ○ | ○ | ○ |
| 12 | 6.58  | 20.0        | 0.11 | 0/0/1  | (◎, ◎) | ○ | ○ | ○ |
| 13 | 13.39 | 20.0        | 0.13 | 0/0/5  | (◎, ◎) | ○ | ○ | ○ |
| 14 | 19.90 | 20.0        | 0.14 | 0/0/10 | (◎, ◎) | ○ | ○ | ○ |
| 15 | 6.80  | 20.0        | 0.16 | 0/0/2  | (◎, ◎) | ○ | ○ | ○ |
| 16 | 6.80  | 19.5        | 0.10 | 0/0/5  | (○, ◎) | ○ | ○ | ○ |
| 17 | 6.80  | 19.5        | 0.11 | 0/0/8  | (○, ○) | ○ | ○ | ○ |
| 18 | 6.80  | 20.0        | 0.15 | 0/0/2  | (◎, ◎) | ○ | ○ | ○ |

*Acid value (calculated value) is a value calculated by $5.7 \times 10^{-17} \times X$ (/g) + 19.45, with proviso that the values within the parenthesis are calculated by $5.7 \times 10^{-17} \times X$ (/g) + 1.77
**L/M/S means large/medium/small scratches.

TABLE 4

| Comp. Ex. No. | Acid Value (Found Value) (mg KOH/g) | Acid Value* (Calc. Value) (mg KOH/g) | Polishing Rate ($\mu$m/min.) | Fine Scratches (L/M/S)** | Surface Roughness (Ra, Rmax) | Micro-Waviness | Surface Defect | Scratches |
|---|---|---|---|---|---|---|---|---|
| 1 | 0.18  | 19.5 (1.80) | 0.02 | 0/0/0  | (○, ◎) | ○ | ○ | ○ |
| 2 | 22.26 | 19.5 (1.80) | 0.18 | 10/0/0 | (○, ◎) | X | ○ | ○ |
| 3 | 30.04 | 19.5 (1.78) | 0.18 | 10/0/0 | (○, ○) | X | ○ | ○ |
| 4 | 0.19  | 20.0        | 0.03 | 0/0/0  | (◎, ◎) | ○ | ○ | X |
| 5 | 30.04 | 20.0        | 0.16 | 5/5/0  | (◎, ◎) | X | ○ | ○ |
| 6 | 38.74 | 20.0        | 0.15 | 10/0/0 | (◎, ◎) | X | ○ | ○ |
| 7 | 27.02 | 20.0        | 0.10 | 10/0/0 | (◎, ◎) | X | ○ | ○ |

*Acid value (calculated value) is a value calculated by $5.7 \times 10^{-17} \times X$ (/g) + 19.45, with proviso that the values within the parenthesis are calculated by $5.7 \times 10^{-17} \times X$ (/g) + 1.77
**L/M/S means large/medium/small scratches.

It can be seen from the results shown in Tables 3 and 4 that all of the polishing compositions obtained in Examples 1 to 18 were remarkably excellent in the effects of reducing fine scratches, as compared to the polishing compositions obtained in Comparative Examples 1 to 7. In addition, all of the polishing compositions obtained in Examples 1 to 18 had higher polishing rates, and were excellent in surface qualities such as the surface roughness, the micro-waviness, the surface defects and the scratches.

By using the polishing composition of the present invention, there can be exhibited such effects that a substrate for use in memory hard disk, a semiconductor element, or the like, having small surface roughness, and reduced surface defects such as projections or polishing damages, and especially dramatically reduced fine scratches having a depth of 0.1 nm or more and less than 5 nm, a width of 10 $\mu$m or more and less than 50 $\mu$m, and a length of 10 $\mu$m or more and less than 1 mm, can be economically produced.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A polishing composition consisting essentially of an abrasive having an average primary particle size of 200 nm or less, an oxidizing agent, an acid having a pK1 of 2 or less and/or a salt of an acid having a pK1 of 2 or less, and water, wherein the acid having a pK1 of 2 or less and/or the salt of an acid having a pK1 of 2 or less is an organic phosphonic acid and/or a salt thereof, and wherein an acid value (Y) of the polishing composition is in the range 1.0 mg KOH/g through 20 mg KOH/g.

2. The polishing composition according to claim 1, wherein the polishing composition has an acid value (Y) in the range 1.0 mg KOH/g through 15 mg KOH/g.

3. A polishing composition consisting essentially of an abrasive having an average primary particle size of 200 nm or less, an oxidizing agent, an acid having a pK1 of 2 or less and/or a salt of an acid having a pK1 of 2 or less, and water, wherein the acid having a pK1 of 2 or less and/or the salt of an acid having a pK1 of 2 or less is selected from the group consisting of nitric acid, sulfuric acid, hydrochloric acid, perchloric acid, and salts thereof with a metal belonging to Group 1A of the Periodic Table or with ammonium, and wherein an acid value (Y) of the polishing composition is in the range 0.2 mg KOH/g through 20 mg KOH/g.

4. The polishing composition according to claim 3, wherein the polishing composition has an acid value (Y) in the range 0.2 mg KOH/g through 5 mg KOH/g.

5. The polishing composition of any one of claims 1 and 2 to 4, wherein the acid value m) of the polishing composition satisfies the formula (1):

$$Y(\text{mg KOH/g}) \leq 5.7 \times 10^{-17} \times X(/\text{g}) + 19.45 \quad (1)$$

wherein X is a concentration of the abrasive in the polishing composition on a numerical basis.

6. A process for reducing the amount of fine scratches imparted to a substrate during a polishing operation, comprising polishing a substrate to be polished with the polishing composition of any one of claims 1 and 2 to 4.

7. A process for reducing the amount of fine scratches imparted to a substrate during a polishing operation, comprising polishing a substrate to be polished with the polishing composition of claim 5.

8. A method for manufacturing a substrate, comprising the step of polishing a substrate to be polished during a manufacturing process with the polishing composition of any one of claims 1 and 2 to 4.

9. A method for manufacturing a substrate, comprising the step of polishing a substrate to be polished during a manufacturing process with the polishing composition of claim 5.

* * * * *